INVENTOR.
BILL C. KNISLEY

Anderson, Luedeka, Fitch, Even & Tabin
ATTORNEYS

United States Patent Office

3,582,476
Patented June 1, 1971

3,582,476
METHOD OF PRODUCING PRODUCTS BY PLATING
Bill C. Knisley, San Diego, Calif., assignor to Stromberg Datagraphics, Inc., San Diego, Calif.
Filed May 10, 1967, Ser. No. 637,505
Int. Cl. B01k 1/00; C23b 7/00
U.S. Cl. 204—11                                              5 Claims

ABSTRACT OF THE DISCLOSURE

A method and master structure for producing circuit patterns, micro circuits, electron beam shaping matrices, and similar highly detailed products made by plating, wherein an oxidizible base plate supports a platable layer which is formed in the configuration of the product and is of a material from which the product may be separated after it is plated thereon, and wherein exposed surfaces on the base plate are oxidized to render them electrically nonconductive so they will not be plated.

---

The present invention relates to methods of producing patterned sheet metal products by plating employed in such methods and more particularly to a method and master structure for producing circuit patterns, microelectric circuits, electron beam shaping matrices and similar products including highly detailed thin metal films.

Many recent technological advances have used highly detailed products produced by plating, which generally constitute a planar sheet of a complex pattern, frequently supported on a web such as a flexible film or on a plastic board. For example, much electrical circuitry and micro circuitry incorporate such products as the circuit pattern. Another example may be found in certain types of cathode ray tubes which utilize a thin metal sheet containing a matrix of shaped apertures for correspondingly shaping the cross section of one or more electron beams passing therethrough.

There are a number of known methods for producing patterned products of the type described above. Many such methods utilize a master structure which includes a platable layer formed in the configuration of the patterned product. The platable layer consists of a material from which the patterned product may be separated after plating, and the patterned product is first electrolytically deposited on the platable layer and then separated therefrom.

In producing highly detailed products of the type described by using a master structure, some difficulties are frequently encountered. The master structure may only be reusable a limited number of times, since successive plating and stripping operations may have a destructive effect on the master. If the master structure is comprised of certain harder materials, overheating during plating may result in cracking or similar damage to the structure. Materials of more desirable quality may be expensive or difficult to fabricate and thus increase manufacturing expense.

It is therefore an object of this invention to provide an improved method for producing products by plating.

Another object of the invention is to provide an improved method for making a master structure for producing products by plating.

A further object of the invention is to provide a method for making products by plating, and which is economical and reliable.

It is another object to provide a master structure which may be utilized repeatedly over a relatively large number of successive operations, and which is not easily damaged from overheating.

Figure 5:
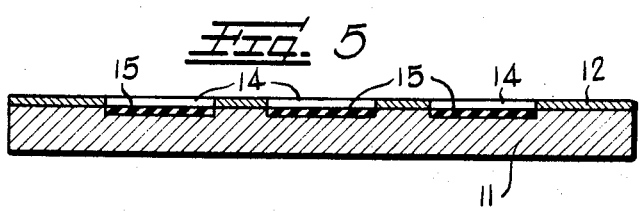
Figure 6:
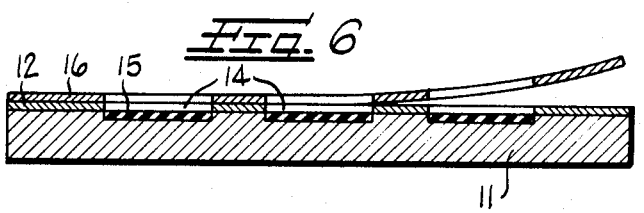
Figure 7:
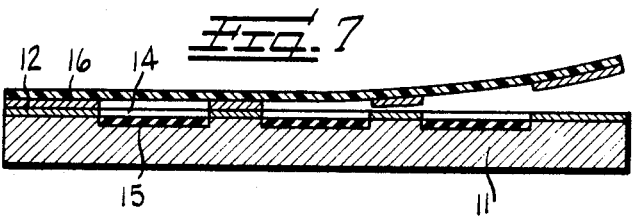

Other objects of the invention will become apparent to those skilled in the art from the following description taken in connection with the accompanying drawings wherein:

FIGS. 1 through 6 are illustrative of successive steps in the methods of the invention, FIG. 5 being also illustrative of a master structure constructed in accordance with the invention; and FIG. 7 is illustrative of another embodiment of the method of the invention.

Very generally, the method of the invention is employed to make a thin sheet or patterned product of a given configuration and of a given material, and for making a master structure for producing such a product. The method comprises coating a base plate of oxidizable material with an etchable and platable material from which the given material is separable when plated thereon. The platable material is then etched away in selected regions to expose portions of the base plate and to leave the remaining platable material in the given configuration. The exposed portions of the base plate are then oxidized to produce the master structure. To produce the sheet product, the remaining platable material is plated with the given material and the given material is then separated therefrom.

Figure 1:
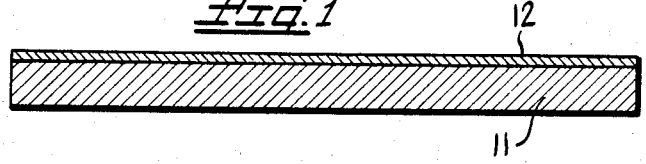

Referring now more particularly to the drawings, the method of the invention will first be described. In making a master structure for producing a sheet product of a given material, a base plate 11 is coated on one side with a uniform thickness of an etchable and platable material 12. The resulting cross section is illustrated in FIG. 1. For a purpose hereinafter explained the base plate 11 is made of a material which is thermally conductive and which has electrical nonconductive oxide. One such material is aluminum. The platable material 12 is selected so that the given material of the sheet product (which may be nickel, copper or the like) is separable when plated thereon. Chromium is one such platable material.

Figure 2:
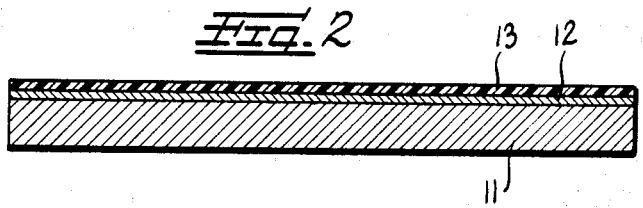

Moving now to FIG. 2, the platable material 12 is coated with a layer of photosensitive etch resistant (photoresist) material 13. The photoresist material is then exposed using a negative of the given configuration—that is, the configuration of the desired sheet product. The photoresist material is then developed in accordance with known photographic resist techniques to remove the exposed area and leave a positive image of the given configuration.

Figure 3:
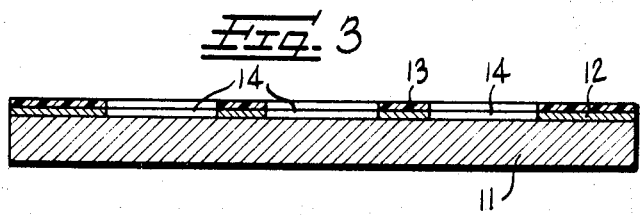
Figure 4:
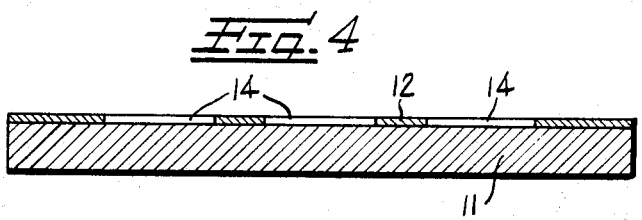

Moving now to FIG. 3, the platable material 12 is etched through in the regions 14 from which the photoresist material has been removed by development to leave only the underlying base plate 11 in these regions. The photoresist material 13 remaining on the unetched platable material is then removed and the resultant cross section appears as in FIG. 4.

Moving now to FIG. 5, the exposed surfaces of the base plate 11 in the etched-away regions 14 of the platable material 12 are treated so as to be not platable. To do this, the exposed surfaces of the base plate on the same side as the layer of platable material 12 are oxidized to provide an electrically nonconductive oxide coating 15 thereon. When aluminum is used as the base plate, a process such as anodizing may be employed to cause oxidation.

The result of the foregoing method is a master structure for producing a sheet product of a given configuration and a given material. In practising the method for making a sheet product in accordance with the invention, the layer of platable material 12 is plated with the given material, such as nickel or copper. The result appears, in cross section, as the left-hand portion of FIG. 6. The layer indicated at 16 comprises the sheet product and may be peeled away from the layer of platable material 12 as indicated on the right-hand portion of FIG. 6. After peeling the sheet product away, the master structure will again appear as in FIG. 5 and may be reused.

In FIG. 6, it is assumed that the various parts of the sheet product are interconnected, such as by bridges or similar expedients. In some cases, however, the sheet product includes islands unconnected with the remaining portions of the product. To maintain such islands in a desired relation with the remainder of the sheet product, a further step may be carried out after the plating step illustrated in FIG. 6. this further step is illustrated in FIG. 7 and consists of covering the entire surface of the sheet product, while it is still on the layer of platable material 12, with an adhesive, such as an epoxy. A web structure, preferably a plastic film such as Mylar, or a plastic board, is then laid across the sheet product. After the adhesive has set so that the web adheres to the sheet product, the web may be lifted to remove the sheet product as indicated in FIG. 7. This peels the sheet product from the master structure, leaving the master structure ready for a successive operation.

It has been found that the method of the invention is readily carried out and is adaptable to high production type operations. It offers a technique in which low-cost easily handled materials are utilized, and control over production operations is relatively simple. The invention also provides a master structure of relatively low-cost materials and which may be easily fabricated. Moreover, the master structure provided by the invention is susceptible of repeated use without significant damage.

It may therefore be seen that the invention provides an improved method for producing a sheet product of a given configuration and a given material. The invention also provides an improved method for making a master structure of the type described.

Various modifications of the invention in addition to those shown and described herein will be apparent to those skilled in the art from the foregoing discussion and accompanying drawings. Such modifications are intended to fall within the scope of the accompanying claims.

What is claimed is:

1. A method for making a thin sheet product of a given configuration and of a given material, comprising: providing a non-oxidized base plate of oxidizable material, coating the base plate with a layer of electrically conductive platable material from which the given material is separable when plated thereon, removing portions of the layer of platable material to leave regions in the given configuration oxidizing only the exposed portions of the base plate, plating the platable material with the given material by a process in which the oxidized portions of the base plate are not plated, and separating the given material from the platable material.

2. A method in accordance with claim 1 in which the layer of platable material is formed in the given configuration by coating the base plate with platable material and etching away the platable material in selected regions to expose portions of the base plate and to leave the remaining platable material in the given configuration.

3. A method in accordance with claim 1 in which the given material is copper, the platable material is chromium, and the base plate is comprised of aluminum.

4. A method in accordance with claim 1 in which a support web of insulating material is attached to the given material before it is separated from the platable material.

5. A method in accordance with claim 4 in which the given material is separated from the platable material by peeling away the web to which the given material is attached.

References Cited

UNITED STATES PATENTS

| | | | |
|---|---|---|---|
| 2,221,502 | 11/1940 | Van de Pol | 204—11 |
| 2,230,868 | 2/1941 | Kuhlman | 204—11 |
| 2,250,435 | 7/1941 | Norris | 204—11 |
| 2,984,595 | 5/1961 | Schumpelt et al. | 204—281 |

TA-HSUNG TUNG, Primary Examiner

T. TUFARIELLO, Examiner

U.S. Cl. X.R.

204—281

UNITED STATES PATENT OFFICE
CERTIFICATE OF CORRECTION

Patent No. 3,582,476  Dated June 1, 1971

Inventor(s) B. C. Knisley

It is certified that error appears in the above-identified patent and that said Letters Patent are hereby corrected as shown below:

Column 1, lines 4 and 5 - for "Stromberg Datagraphics, Inc." read "Stromberg DatagraphiX, Inc.".

Column 1, line 25 - after "plating" insert "and master structures".

Column 1, lines 26-27 - after "method" delete "and master structure".

Column 3, lines 32-34 - the sentence "The invention also provides an improved method for making a master structure of the type described." should be deleted.

Signed and sealed this 14th day of December 1971.

(SEAL)
Attest:

EDWARD M. FLETCHER, JR.            ROBERT GOTTSCHALK
Attesting Officer                  Acting Commissioner of Patents